United States Patent [19]

Suresh et al.

[11] Patent Number: 5,666,485

[45] Date of Patent: Sep. 9, 1997

[54] SOFTWARE DRIVER FOR A SYSTEM BUS

[75] Inventors: Gananathan Suresh, Potomac, Md.; Ki B. Kang, Centreville, Va.; Young Il Kim, Gaithersburg, Md.

[73] Assignee: Samsung Electronics Inc., Ridgefield Park, N.J.

[21] Appl. No.: 474,174

[22] Filed: Jun. 7, 1995

[51] Int. Cl.⁶ ........................................ G06F 13/00
[52] U.S. Cl. ................. 395/185.01; 395/293; 395/185.07
[58] Field of Search .................... 395/185.01, 185.07, 395/185.08, 293, 472, 475, 478, 842, 848, 728, 200.08, 200.05

[56] References Cited

U.S. PATENT DOCUMENTS

| | | | |
|---|---|---|---|
| 4,368,514 | 1/1983 | Persaud et al. | 295/200.05 |
| 5,007,011 | 4/1991 | Murayama | 395/421.03 |
| 5,333,269 | 7/1994 | Calvignac et al. | 395/200.08 |
| 5,339,443 | 8/1994 | Lockwood | 395/732 |

*Primary Examiner*—Robert W. Beausoliel, Jr.
*Assistant Examiner*—Ly V. Hua
*Attorney, Agent, or Firm*—Jones & Volentine

[57] ABSTRACT

In a system bus having a master-slave architecture, shared memory controlled by a plurality of registers, master-slave central processing units, and master-slave bus controllers, a process of reading and writing data to the shared memory is disclosed. The process comprises the steps of requesting access to the shared memory by the central processing units by writing a request bit on a first register; reading an access bit on a second register to determine whether the access bit is set and access to shared memory is granted; reading or writing data to the shared memory by the central processing units; and reading the access bit on the second register to determine whether the access bit is cleared and access to the shared memory is complete. The access bit is set by the master-slave bus controller.

14 Claims, 9 Drawing Sheets

I/O Out_Ctrl Register (0x 7000 C000 - Write Only)

72 — | CIR | SRQ | STX | GL4 | GL3 | GL2 | GL1 | GL0 |  (msb ... lsb)

FIG. 7A

CIR - Clear SSB Interrupt Request
SRQ - SSB Memory Access Request
STX - Start SSB Transfer
GL4 - GL0 - Destination Slot ID I/O In_Ctrl Register (0x 7000 D000 - Read Only)

74 — | X | X | X | X | X | X | X | SGT |  (msb ... lsb)

FIG. 7B

SGT - SSB Memory Access Grant
X - Don't Care

I/O Reset Register (0x 6300 0001 - Read/Write)

76 — | X | X | X | X | X | X | X | SRT |  (msb ... lsb)

FIG. 7C

SRT - SSB Reset
X - Preserve Values

General Status Register (0x 7000 7000 - Read Only)

78 — | X | X | X | X | X | X | X | GS0 |  (msb ... lsb)

FIG. 7D

GS0 - SSB Block Transfer Parity Error
X - Don't Care

FIG. 8A

I/O RQST Register (0x 8000 0004 – Write Only)

| msb | | | | | | | | | | | | | | | | | | | | | | | | | | | | | | | lsb |
|---|---|---|---|---|---|---|---|---|---|---|---|---|---|---|---|---|---|---|---|---|---|---|---|---|---|---|---|---|---|---|---|
| X | X | X | X | X | X | X | X | X | X | X | X | X | X | X | X | X | X | X | X | X | X | X | X | X | X | X | X | X | X | X | SRQ |

SRQ – SSB Memory Access Request
X – Don't Care

I/O ACK Register (0x 8000 000C – Read Only)

| msb | | | | | | | | | | | | | | | | | | | | | | | | | | | | | SGT | PEB | lsb |
|---|---|---|---|---|---|---|---|---|---|---|---|---|---|---|---|---|---|---|---|---|---|---|---|---|---|---|---|---|---|---|---|
| X | X | X | X | X | X | X | X | X | X | X | X | X | X | X | X | X | X | X | X | X | X | X | X | X | X | X | X | X | SGT | PEB | X |

SGT – SSB Memory Access Grant      PEB – SSB Block Transfer Parity Error
X – Don't Care

I/O DONE Register (0x 8000 0008 – Write Only)

| msb | | | | | | | | | | | | | | | | | | | | | | | | | | | | | | | lsb |
|---|---|---|---|---|---|---|---|---|---|---|---|---|---|---|---|---|---|---|---|---|---|---|---|---|---|---|---|---|---|---|---|
| X | X | X | X | X | X | X | X | X | X | X | X | X | X | X | X | X | X | X | X | X | X | X | X | X | X | X | X | X | X | X | DON |

DON – Release SSB
X – Don't Care

I/O Reset Register (0x 6300 0001 – Write Only)

| msb | | | lsb |
|---|---|---|---|
| X | X | X | SRT |

SRT – SSB Reset
X – Preserve Values

SOFTWARE DRIVER FOR A SYSTEM BUS

BACKGROUND OF THE INVENTION

1. Field of the Invention

The present invention generally relates to a software driver for a system bus, and, more particularly, to a method of providing read and write access to the system bus for all the components on the system.

2. Description of the Prior Art

A system bus enables the exchange of data, usually in word-size quantities, among the various computer system units. In practice, a large number of units are connected to a single bus, with each unit contending in an orderly way for use of the bus for individual transfers.

The timing and sequence of data exchange between system components is controlled by a particular network bus architecture. One such architecture is known as Ethernet. All stations in a Ethernet are connected, through network interface cards or connectors, to a cable that is run to each user's equipment. The Ethernet network uses a protocol called carrier-sense multiple access with collision detection (CSMA/CD). In the CSMA/CD protocol, each station shares the cable by constantly monitoring the cable to detect when it is idle (no user transmitting), when one user is transmitting (successfully), or when more than one user is simultaneously trying to transmit (collision).

The cable basically acts as a broadcast bus. Any station may transmit on the cable if the station detects it to be idle. Once a station transmits, other stations will not interrupt the transmission. With collision detection, if two stations begin to transmit at the same time, they detect the collision, stop, and retry after a randomly chosen period of time.

Ethernet, and other bus architectures, require complex protocols to set up the messages and manage the data transfer. Finally, complex hardware schemes are required to support data transfer and error checking functions.

In light of the foregoing, there exists a need for to an simplified, efficient software driver for a system bus that reduces the amount of hardware and complex software required to perform the task.

SUMMARY OF THE INVENTION

The present invention is directed to software driver for a system bus which substantially obviates one or more of the problems due to the limitations and disadvantages of the related art.

In general, the system bus is used by upper layer software processes to communicate between any two modules within a network architecture. The method of the present invention is designed for a bus controller hardware design having a master-slave interface with the master being the active system processing unit (SPU) and the slave is any other module within the network.

In this configuration, a standby SPU is also considered to be a slave. This allows the system bus to be used for communication between active and standby SPUs. The bus controller design does not allow two slave modules to communicate without the intervention of the master module central processing unit.

The master and slave CPUs use shared memory (SRAM) and system bus registers to communicate with their respective bus controllers. System bus registers are used for requesting access to the system bus shared memory from the bus controller. Once access is granted, a CPU can write to or read from respective message transmit (Tx) and receive (Rx) areas of the shared memory. When the CPU has finished accessing shared memory, system bus registers are used to release control and instruct the bus controller.

The system bus software driver provides read and write access to the system bus for all components on the system. Access to the system bus is controlled by the bus controller hardware on every module. The system bus software driver provides the required handshake with the bus controller to communicate with other modules in the system.

When there is a need to write to the system bus, this software driver will request the bus controller and wait for the grant to write. When there is something to be read from the system bus, this software driver will service the bus controller incoming message interrupt.

The system bus software driver will keep track of system bus block read parity errors and any bus controller access timeouts. Statistics are maintained under these circumstances and the bus controller is reset to try and recover from the situation.

Upper layer software protocols have to detect any lost messages and recover them. Also, none of the system bus data is interpreted by the software driver.

To achieve these and other advantages and in accordance with the purpose of the invention, as embodied and broadly described, the invention provides for a process of writing data to shared memory controlled by a plurality of registers in a system bus having a master-slave architecture, a master central processing unit, and a master bus controller, the process comprising the steps of: requesting access to the shared memory by the master central processing unit by writing a request bit on a first register; reading an access bit on a second register to determine whether the access bit is set and access to shared memory is granted; writing data to the shared memory by the master central processor; and reading the access bit on the second register to determine whether the access bit is cleared and access to the shared memory is complete.

In another aspect, the above invention provides for a process of reading data from shared memory, the process comprising the steps of: requesting access to the shared memory by the master central processing unit by writing a request bit on a first register; reading an access bit on a second register to determine whether the access bit is set and access to shared memory is granted; identifying whether parity errors exist; reading data from the shared memory by the master central processor if parity is correct; reading the access bit on the second register to determine whether the access bit is cleared and access to the shared memory is complete.

The above processes are equally applicable to slave module read/write procedures.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The software driver of the present invention can be used in conjunction with the Apparatus and Method for Intermodular Communications Using System Bus Controllers, disclosed in U.S. patent application, Ser. No. 08/482,396 filed Jun. 7, 1995 by Young-Il Kim et al., the entire disclosure of which is incorporated herein by reference. Portions of the specification of the Jun. 7, 1995 patent application are reproduced in appropriate sections below for ease of reference and discussion.

Figure 1:
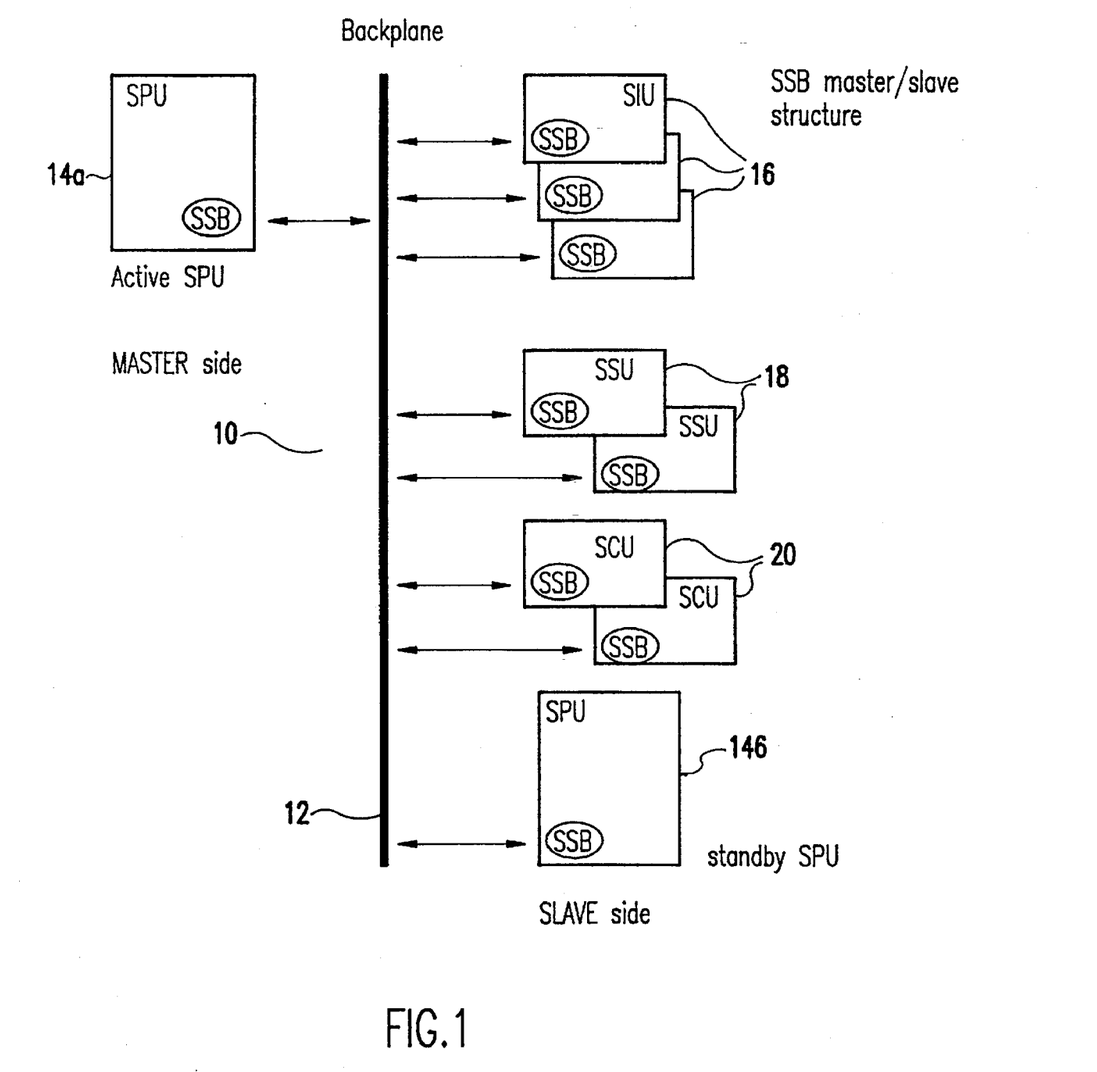
FIG. 1 is a diagrammatical representation of the system bus structure of the present invention.

Referring now to the drawings, and more particularly to FIG. 1, there is shown a general overview of a system bus architecture 10 employing the apparatus and method of the present invention. As shown, the system bus architecture includes a backplane bus 12 in communication with a plurality of, respectively, system processor units (SPU) 14a and 14b, system interface units (SIU) 16, system switch units (SSU) 18, and system clock units (SCU) 20. While there are a plurality of SPUs, SIUs, SSUs, and SCUs shown in FIG. 1, it is understood that depending on the particular system configuration, any number of the respective units may interface with the backplane 12, including single embodiments of the respective units.

The backplane bus 12 is a sixteen (16) bit wide high speed parallel bus with data transfer capability of up to 10 MBytes/sec. It is thus about eight times faster than Ethernet transmissions. Interprocessor communication traffic on this high speed bus will mostly be in burst mode and point-to-point in nature. At times the point-to-point traffic could become stream mode, although it is estimated that the frequency of stream traffic would be very low. Instances of stream mode data transfer would occur between modules during initial download, during accounting data transfer, and during management data transfer between the network management stations. The SPU may be required to do broadcasts at certain times and broadcast data will always be in burst mode. In most cases, burst mode IPC applications will transfer a single message buffer. Currently the maximum size of an internal operating system message buffer within bus structure is 1024 bytes.

In the embodiment shown in FIG. 1, the backplane bus 12 supports communication between an active SPU 14a on the master side, and the various interface 16, switch 18 and clock 20 units on the slave side. The standby SPU 14b also runs in the slave mode. Either one, but only one, of the SPUs may be designated the master (active), and the other must be designated a slave (standby) as there can be only one master processor for the system. As shown in FIG. 1, the communication channels are bidirectional through the backplane.

Figure 2:
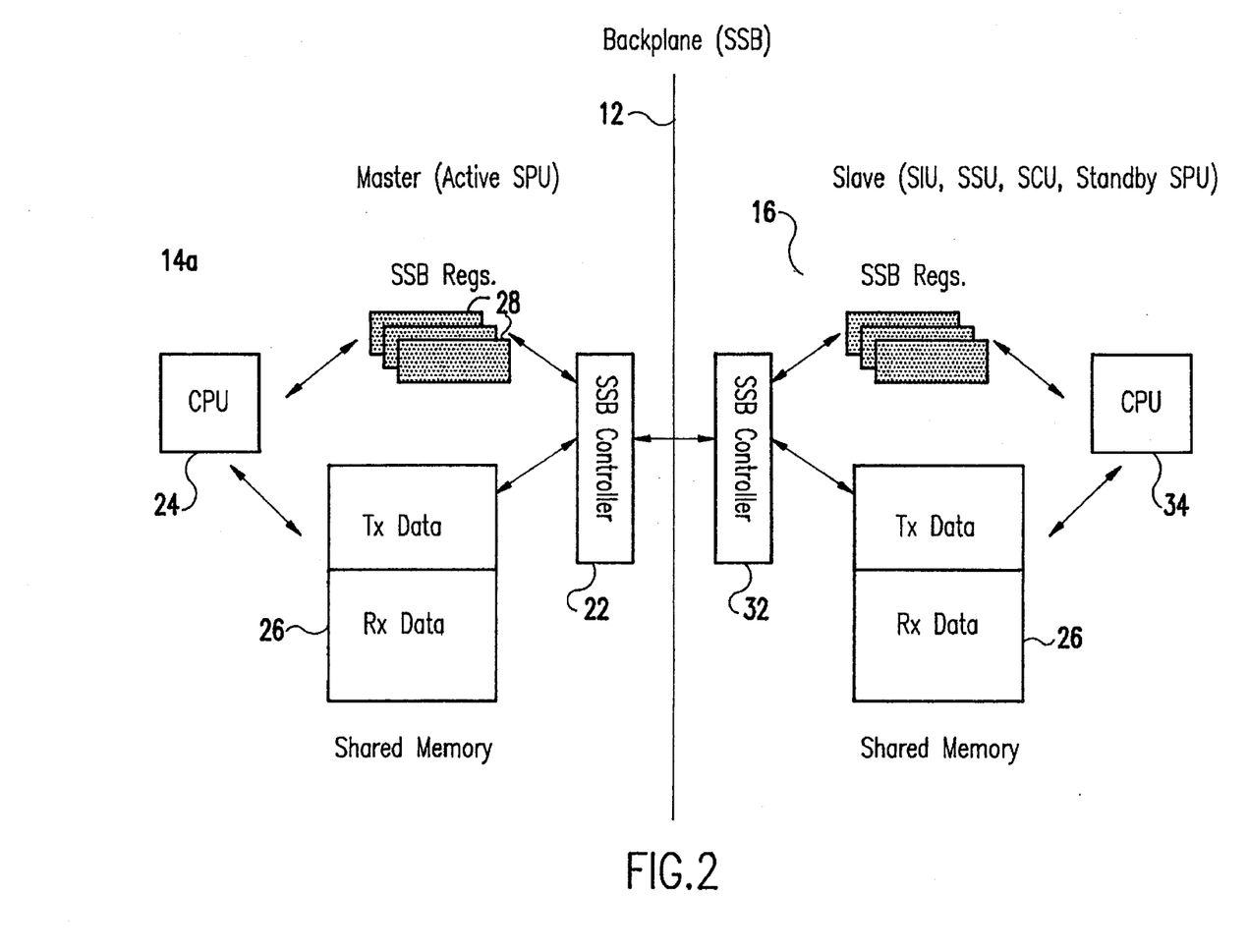
FIG. 2 is a diagrammatical representation of the functional components of the master and slave modules.

The internal configuration and operation of each of the modules is functionally similar. As shown in FIG. 2, the master module (i.e., the active SPU 14a) has an associated bus controller 22 and central processing unit 24. Similarly, the slave module 16 (e.g., an SIU) also has an associated bus controller 32 and central processing unit (CPU) 34. For simplification, only one slave module is shown in FIG. 2. It is understood that each of the interface 16, switch 18, and clock 20 units, and the standby SPU 14b, all contain a bus controller and central processing unit (CPU).

Each of the bus controllers of the master and slave modules interface with a shared bus memory, in particular a static random access memory (SRAM) device 26. The SRAM 26 is divided into two sections, Receive (Rx) and Transmit (Tx), and is used to save the messages generated for each direction of the microprocessor. The Tx and Rx areas are able to hold up to 4096 bytes each at any one time. This memory capacity may be increased if necessary.

The communications protocol on the backplane is controlled by the master bus controller 22, which controls the negotiation and direction of data flow through the backplane between the master and slave CPUs and generates the access timing sequences between the SPU and each SIU, SSU, and SCU to provide read and write access to the particular requesting microprocessor.

When there is no traffic to be passed, all of the slave bus controllers 32 (SCUs, SIUs, SSUs, and the standby CPU) show a READY signal through the backplane. The READY signal indicates that the CPU has approval to access the particular slave module. Conversely, when the READY signal is deactivated, the CPU can not access the module.

The master CPU 24 can easily access the shared memory of each of the slave SRAMs. Access to SRAM 26 is carried out through a series of control registers that communicate with the bus controller. After the CPU has finished accessing shared memory, control registers are used to release control and signal the bus controller accordingly.

Figure 7A:
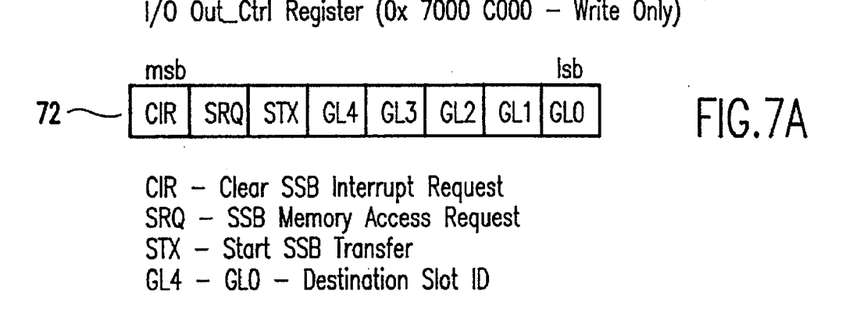
FIGS. 7A–7D illustrate the control registers associated with the master SPU.
Figure 7B:
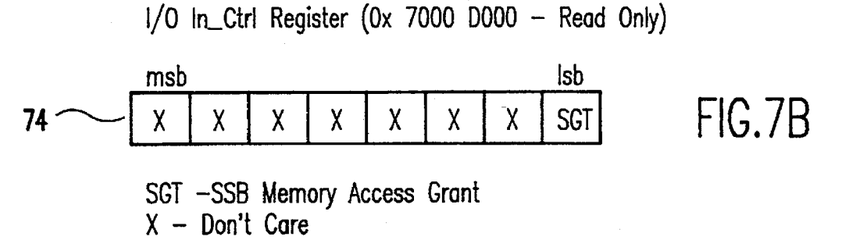
Figure 7C:
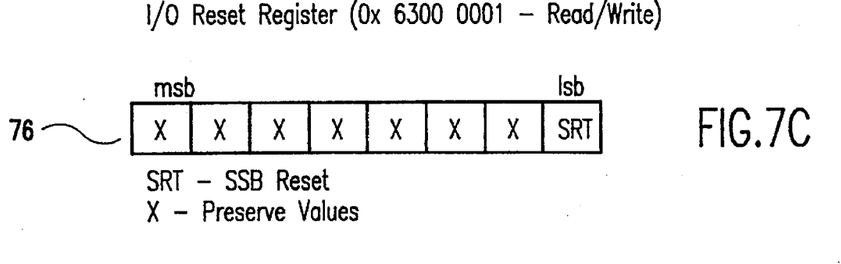
Figure 7D:
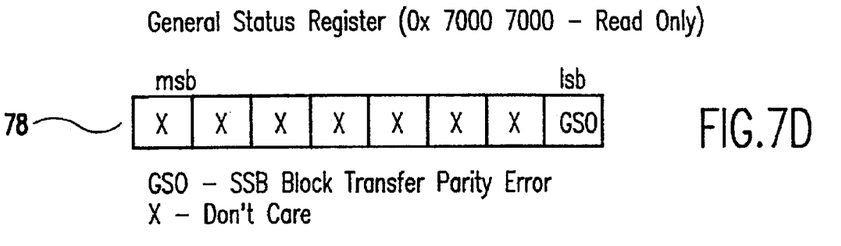
Figure 8A:
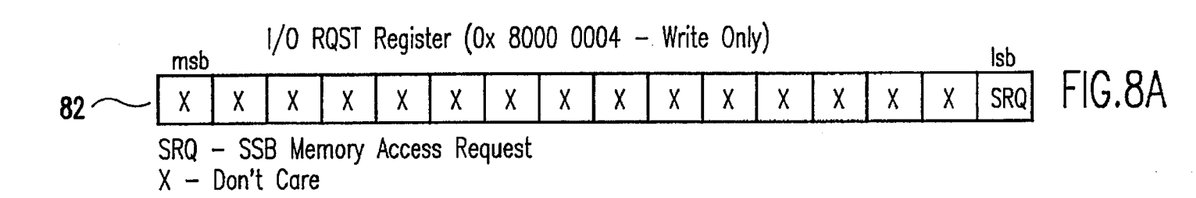
FIGS. 8A–8D illustrate the control registers associated with the slave modules.
Figure 8B:
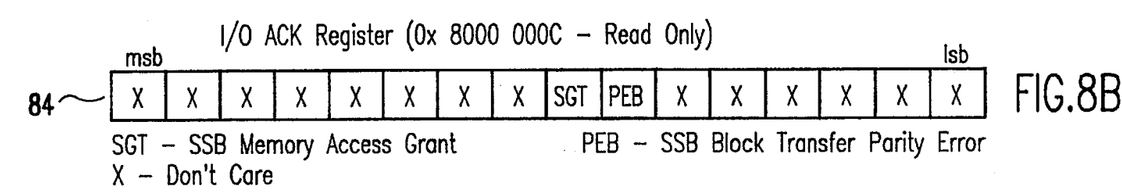
Figure 8C:
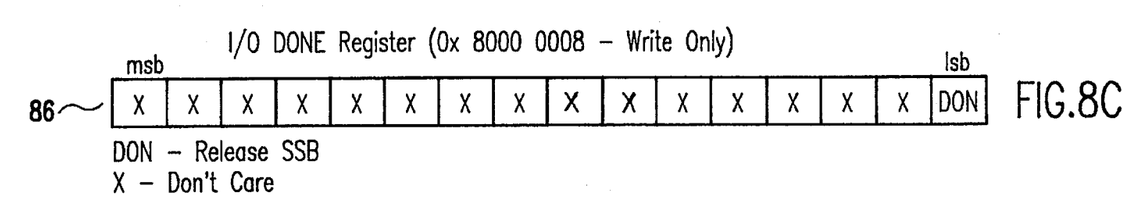
Figure 8D:
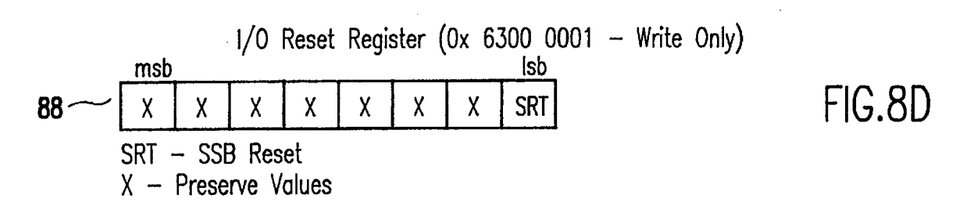
Figure 9A:
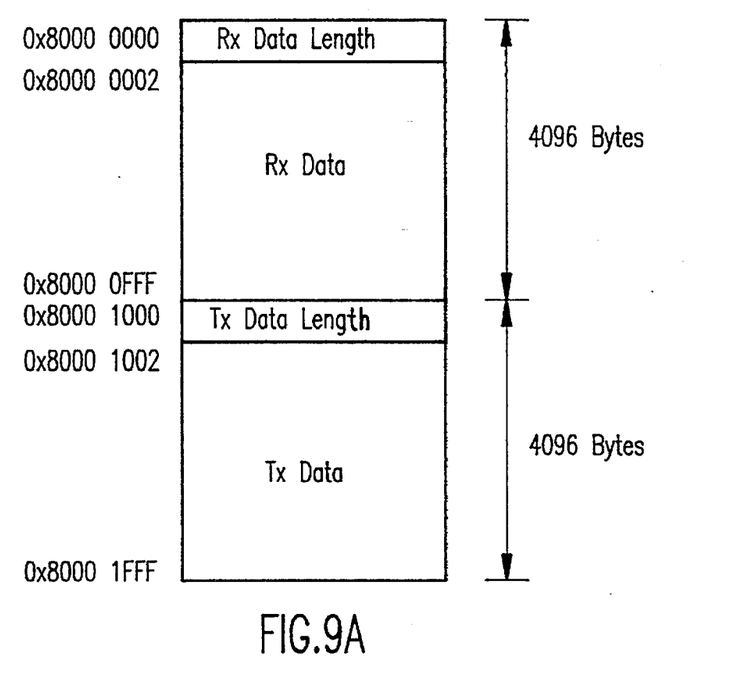
FIG. 9A illustrates the memory map of the master SPU.
Figure 9B:
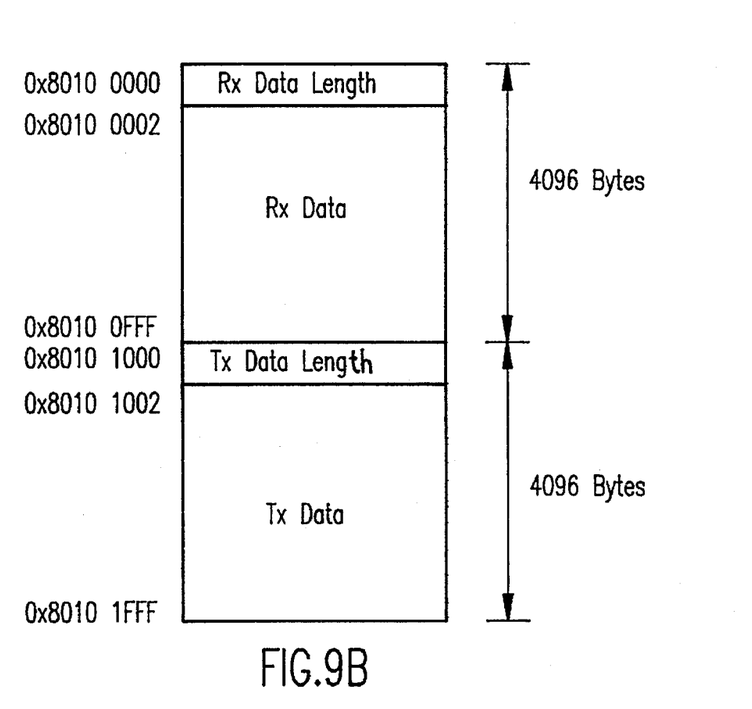
FIG. 9B illustrates the memory map of the other modules.

The system bus memory map and register definitions are different on the SPU from all the other modules. FIG. 7 depicts the registers and FIG. 9A depicts the memory map associated with the SPU. FIG. 8 depicts the registers and FIG. 9B depicts the memory map associated with all other modules (slaves).

The bus controller access procedures are also different on the SPU from all the other modules. Accordingly, two different system bus drivers will be implemented; one for the active master SPU and a second for the slave modules.

The SPU bus driver will allow the SPU to act as a master or a slave. On the SPU, these two roles use the same read and write procedures to access the bus controller.

Each of the read and write procedures will now be described in detail. While the procedures discussed below reference particular bits and registers, it is understood that a variety of bit/register combinations may be utilized in the practice of this invention.

SPU Bus Driver Write Procedure

Figure 3:
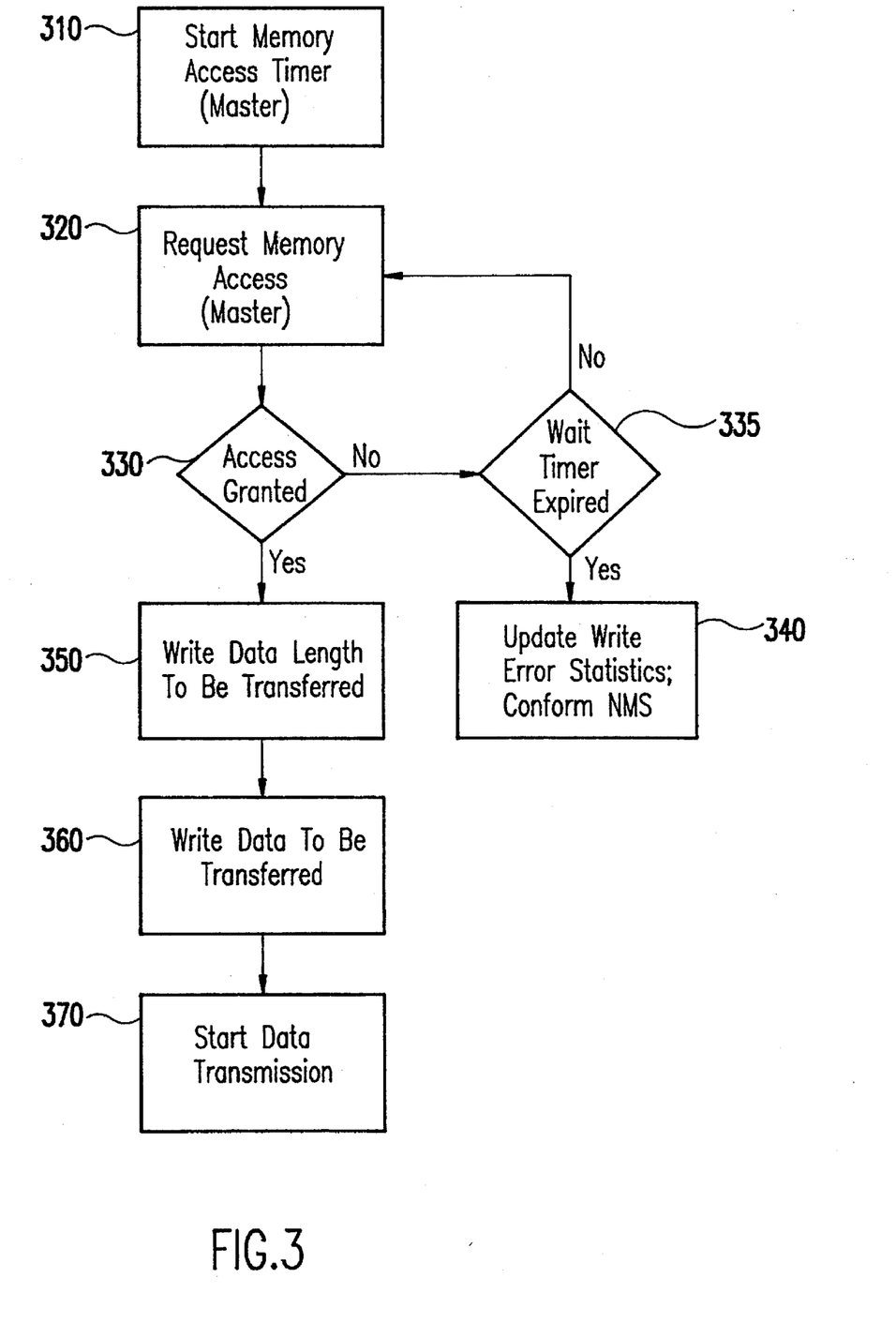
FIG. 3 is a flow diagram of the SPU bus driver write procedure.

The write procedure for the SPU bus driver will be discussed with reference to the steps depicted in FIG. 3 and the master module 14a depicted in FIG. 2 and its associated CPU 24 and bus controller 22.

1. After a memory access timer is started (step 310), the CPU 24 requests access for the system bus shared memory 26 (step 320) by writing the SRQ bit on an I/O Out_Ctrl register 72 (FIG. 7A).

2. The CPU 24 waits for the access grant by reading the SGT bit on an I/O In_Ctrl register 74 (FIG. 7B), which is set by the bus controller 22. The worst case wait state would be about 400 microseconds when the bus controller is transferring an entire 4K bytes into system bus Rx area (4K bytes at 10 MBytes/sec) from a slave.

3. If access is not granted and the retry count is exceeded (steps 330 and 335), the CPU will write the SRT bit on an I/O Reset register 76 (FIG. 7C), increment the system bus write error statistics, send SNMP (Simple Network Management Protocol) trap, and return an error signal to the caller (step 340).

4. If retry count is not exceeded (step 335) then access is requested again (step 320). If access is granted, the CPU would then write the specified data length and data (steps 350 and 360) to the system bus Tx area from a local buffer.

5. The data transmission is started (step 370) by setting the STX bit in the I/O Out_Ctrl register 72 (FIG. 7A). The GL0–GL4 bits are set with the destination slot identifier. In the broadcast mode, all "1s" would be written to GL0–GL4.

6. The CPU then waits for the SGT bit on the I/O In_Ctrl register 74 (FIG. 7B) to be cleared.

7. If a retry count is exceeded, the CPU will write the SRT bit on the I/O Reset register 76 (FIG. 7C), increment the system bus write error statistics, and return an error signal to the caller.

8. If the retry count is not exceeded, the CPU returns OK

SPU Bus Driver Read Procedure (ISR)

Figure 4:
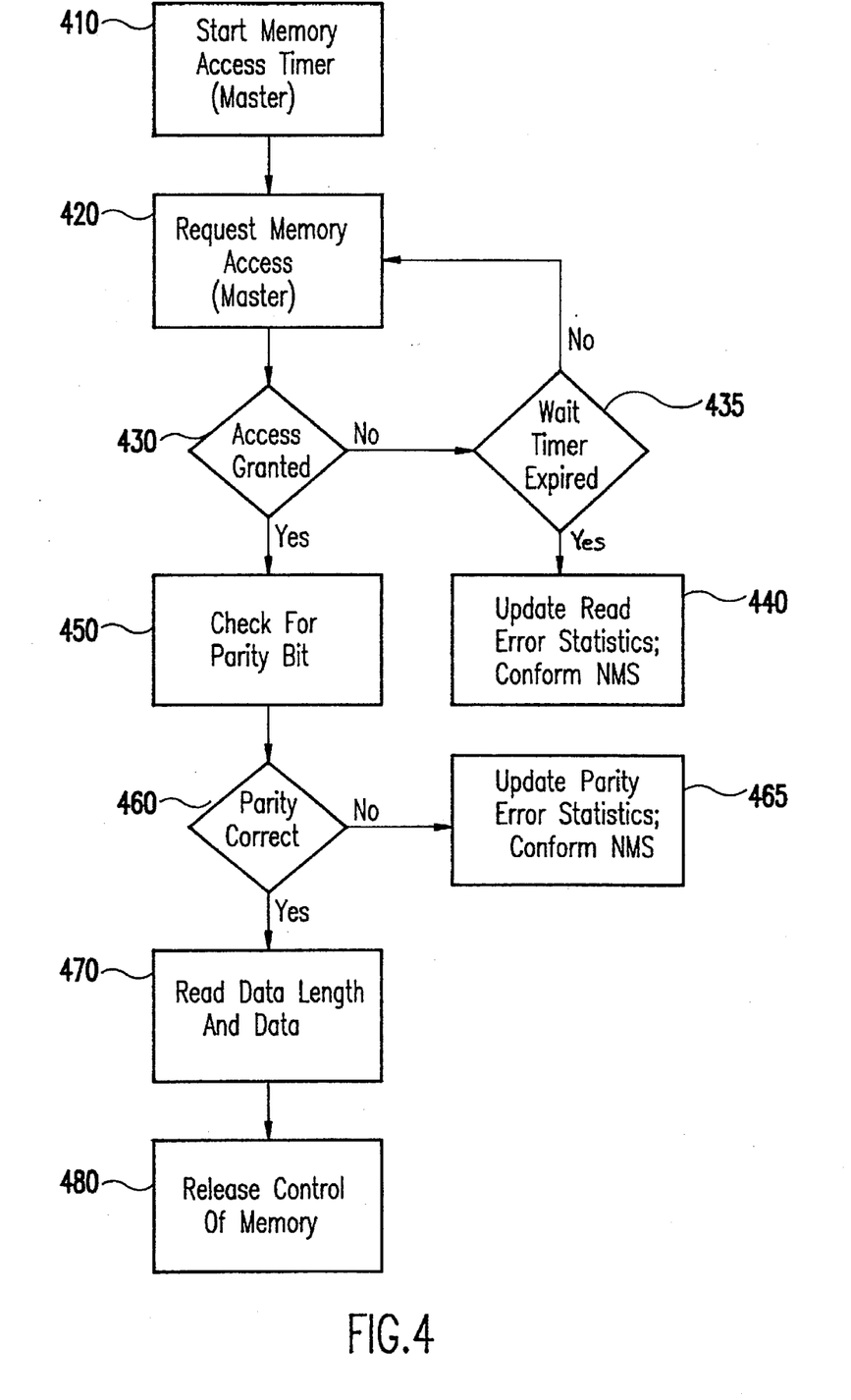
FIG. 4 is a flow diagram of the SPU bus driver read procedure.

The read procedure for the SPU bus driver will be discussed with reference to the steps depicted in FIG. 4 and the master module 14a depicted in FIG. 2 and its associated CPU 24 and bus controller 22.

1. After a memory access timer is started (step 410), the CPU 24 services an external interrupt from the system bus and a bus driver interrupt service request (ISR) is entered.

2. The CPU 24 requests access for the shared memory 26 (step 420) by writing the SRQ bit on the I/O Out_Ctrl register 72 (FIG. 7A).

3. The CPU waits for the access grant by reading the SGT bit on the I/O In_Ctrl register 74 (FIG. 7B), which is set by the bus controller 22.

4. If access is not granted and the retry count is exceeded (steps 430 and 435), the CPU will write the SRT bit on the I/O Reset register 76 (FIG. 7C), increment the system bus read error statistics, send SNMP trap and exit ISR (step 440).

5. If the retry count is not exceeded (step 435) then access is requested again (step 420). If access is granted, the CPU then reads the General Status register 78 (FIG. 7D) and checks for the CS0 bit. If set, indicating a parity error (step 460), the CPU writes the SRT bit on the I/O Reset register 76 (FIG. 7C), increments the system bus block transfer parity error statistics, sends SNMP trap (step 465) and exits ISR.

6. When the GS0 bit is not set, signifying no parity errors (step 460), the SPU reads the specified data length and data (step 470) at the system bus Rx area into a local buffer.

7. The CPU then writes the CIR bit of the I/O Out_Ctrl register 72 (FIG. 7A) to clear the interrupt and release control of the shared memory (step 480).

8. The CPU then waits for SGT bit on the I/O In_Ctrl register 74 (FIG. 7B) to be cleared.

9. If the retry count is exceeded, the CPU writes the SRT bit on the I/O Reset register 76 (FIG. 7C), increments the error statistics, sends SNMP trap and exits ISR.

10. If retry count is not exceeded, the CPU clears the CIR bit on the I/O Out_Ctrl register 74 (FIG. 7A).

11. The CPU then signals the arrival of data to the upper layer software and exits ISR.

Slave Bus Driver Write Procedure

Figure 5:
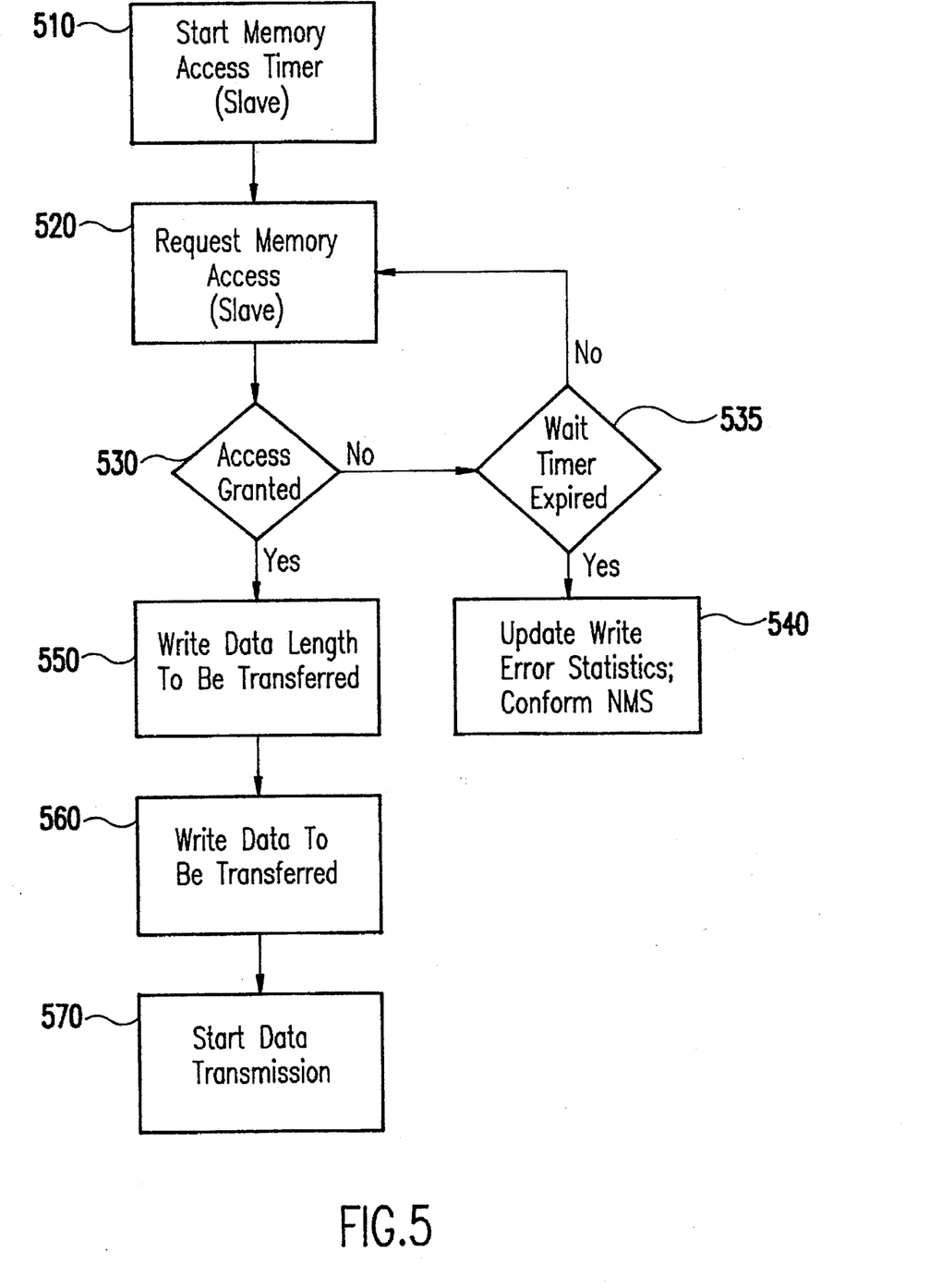
FIG. 5 is a flow diagram of the slave bus driver write procedure.

The write procedure for the slave bus driver will be discussed with reference to the steps depicted in FIG. 5 and the slave module depicted in FIG. 2 and its associated CPU 34 and bus controller 32.

1. After a memory access timer is started (step 510), the CPU 34 requests access for the shared memory 26 (step 520) by writing the SRQ bit on I/O RQST register 82 (FIG. 8A).

2. The CPU 34 waits for the access grant by reading the SGT bit on an I/O ACK register 84 (FIG. 8B), which is set by the bus controller 32. The worst case wait state would be about 400 microseconds when the bus controller is transferring an entire 4K bytes into system bus Rx area (4K bytes at 10 MBytes/sec) from a master.

3. If access is not granted and the retry count is exceeded (steps 530 and 535), the CPU 34 will write the SRT bit on the I/O Reset register 88 (FIG. 8D), increment the system bus write error statistics, send SNMP trap and return an error signal to the caller (step 540).

4. If retry count is not exceeded (step 535), then access is requested again (step 520). If access is granted, the CPU would then write the specified data length and data (steps 550 and 560) to the system bus Tx area from a local buffer.

5. The data transmission to the master is started (step 570) by setting the DON bit in the I/O DONE register 86 (FIG. 8C).

6. Return OK.

Slave Bus Driver Read Procedure (ISR)

Figure 6:
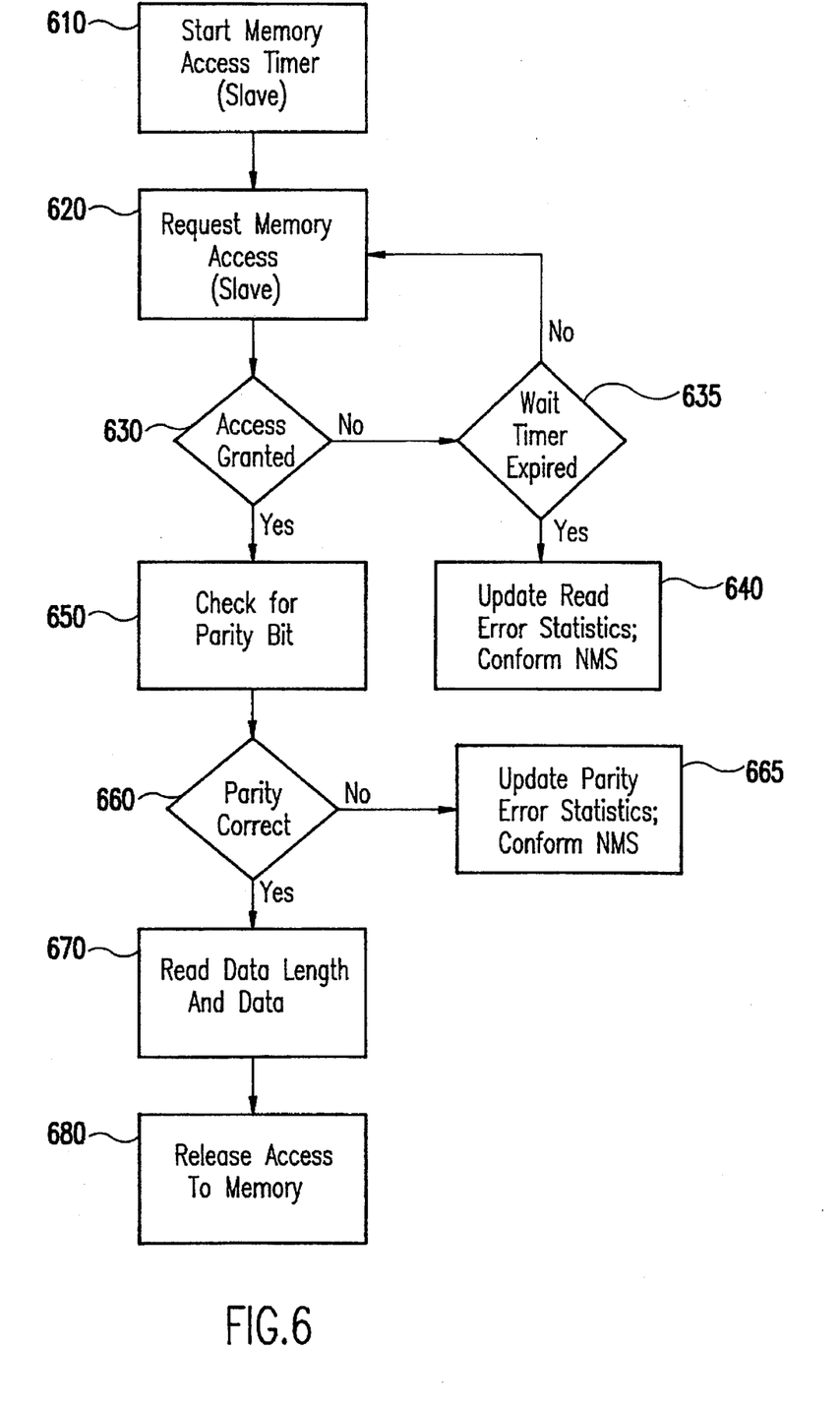
FIG. 6 is a flow diagram of the slave bus driver read procedure.

The read procedure for the slave bus driver will be discussed with reference to the steps depicted in FIG. 6 and the slave module depicted in FIG. 2 and its associated CPU 34 and bus controller 32.

1. After a memory access timer is started (step 510), the CPU 34 services an external interrupt from the system bus and a bus driver ISR is entered.

2. The CPU 34 requests access for the shared memory 26 (step 620) by writing the SRQ bit on the I/O RQST register 82 (FIG. 8A).

3. The CPU waits for the access grant by reading the SGT bit on the I/O ACK register 84 (FIG. 8B), which is set by the bus controller 32.

4. If access is not granted and the retry count is exceeded (steps 630 and 635), the CPU 34 will write the SRT bit on the I/O Reset register 88 (FIG. 8D), increment the system bus read error statistics, send SNMP trap and return an error to the caller (step 640).

5. If the retry count is not exceeded (step 635) then access is requested again (step 620). If access is granted, the CPU then reads the I/O ACK register 84 (FIG. 8B) for the PEB bit being set (step 650), indicating a parity error. If PEB is set (step 660), the CPU writes the SRT bit on the I/O Reset register 88 (FIG. 8D), increments the system bus block transfer parity error statistics, sends SNMP trap (step 665) and exits ISR.

6. When the PEB bit is not set (step 660), signifying no parity errors, the CPU reads the specified data length and data (step 670) at the system bus Rx area into a local buffer.

7. The CPU then sets the DON bit on the I/O DONE register 86 (FIG. 8C) to release access to shared memory 86.

8. The CPU then signals the arrival of data to the upper layer software and exits ISR.

Bus Interrupts

All modules use a common CPU module that is i960 (from Intel Corporation) configured to use the eight external interrupts in mixed mode. Under mixed mode, interrupt pins 0 through 4 are configured for expanded mode. Pins 5 through 7 are configured to be dedicated mode.

Expanded mode pins are encoded for the five most significant bits (msbs) of the expanded mode vector number. The three least significant (lsbs) bits of the vector number are set internally to be $010_2$. The 5 pins under expanded mode could provide up to 32 additional interrupt sources to the CPU. The system bus Interrupt uses the expanded interrupt value of 19, so the interrupt vector number is $10011010_2$ ($19=10011_2=5$ msbs and $010_2=3$ lsbs). The interrupt priority is the vector number divided by 8 (154/8), which is 19.

Driver Implementation

The system bus driver will only request for the bus controller when there is a packet ready to be transferred to the system bus shared memory. The system bus shared memory will be immediately released once the transfer is over. Bus controller interrupts will be serviced as an high priority interrupt and all measures will be taken to reduce the interrupt latency.

System bus drivers will only act as a transport medium between upper network layer protocol (Internet Protocol (IP)) and lower layer bus medium. The bus driver will not perform any link level protocol. If there are any transmission errors, the driver will drop the packet and inform the network management system (NMS). Upper level IPC protocols (Transmission control protocol—TCP) will detect the lost packet and recover from these errors. Therefore, all applications using the system bus for IPC will have to use the services provided by the system IPC to guarantee reliable transmission.

Routing to destination slots is also done at the upper layer protocol (IP). All source and destination information required by the upper layer routing is kept within the system bus data sent to or received from the upper layer. Thus, the system bus transparently passes this information to the upper layer. All modules will have the muting information required to route to any modules within the network and also detect packets which are destined to other modules. This routing information is configured at the upper layer protocol (IP). When IPC packets are sent between two slave modules, the master module will transparently pass this packet to the upper layer. The upper layer protocol (IP) will send the packet back to the system bus with the proper destination information.

Bus Driver Interfaces

The bus drivers are coupled with network services (pNA+) provided by the operating system (pSOS+). The procedures followed by pNA+ for packet transmission and reception are described below.

When pNA+ wants to transmit a packet, it will request a buffer from the system bus. These buffers will be maintained in DRAM by the bus driver. Once pNA+ is ready to transmit, it will call the bus driver function (bus_Send or bus_Broadcast) with packet buffer, length and destination slot as parameters. The bus_Send function will report the transmission status to pNA+ and return the packet buffer back to the buffer pool.

When a packets arrives on the bus interface, the bus controller hardware will interrupt the CPU. The CPU will execute the system bus ISR to process incoming packet. Within the ISR, the packet will be copied into a local buffer and pNA+ will be informed of the packet arrival.

In summary, the software bus driver of the present invention provides for a unique simplified interface for reading and writing information on a bus transmission medium.

Reading data from the bus is achieved via interrupts provided by the bus hardware controller. Once the interrupt is received, data can be read from the bus receive memory using input/output control registers. Writing data to the bus transmit memory is achieved using the same input/output control registers.

While the invention has been described in terms of the embodiments described above, those skilled in the art will recognize that the invention can be practiced with modification within the spirit and scope of the appended claims.

Having thus described my invention, what we claim as new and desire to secure by Letters Patent is as follows:

1. In a system bus having a master-slave architecture, shared memory controlled by a plurality of registers, a master central processing unit, and a master bus controller, a process of writing data to the shared memory, the process comprising the steps of:

requesting access to said shared memory by said master central processing unit by writing a request bit on a first register;

reading an access bit on a second register to determine whether the access bit is set and access to shared memory is granted;

writing data to the shared memory by said master central processor; and reading the access bit on the second register to determine whether the access bit is cleared and access to the shared memory is complete.

2. The process of claim 1, wherein the access bit is set by the master bus controller.

3. The process of claim 1, further including the steps of starting a shared memory access timer;

determining whether the timer has expired if access to shared memory is not granted;

repeating said requesting step if access to shared memory is not granted and the timer has not expired; and updating write error statistics of access to shared memory is not granted and the timer has expired.

4. In a system bus having a master-slave architecture, shared memory controlled by a plurality Of registers, a master central processing unit, and a master bus controller, a process of reading data from shared memory, the process comprising the steps of:

requesting access to said shared memory by said master central processing unit by writing a request bit on a first register;

reading an access bit on a second register to determine whether the access bit is set and access to shared memory is granted;

identifying whether parity errors exist;

reading data from the shared memory by said master central processor if parity is correct; and reading the access bit on the second register to determine whether the access bit is cleared and access to the shared memory is complete.

5. The process of claim 4, wherein the access bit is set by the master bus controller.

6. The process of claim 5, further including the steps of starting a shared memory access timer;

determining whether the timer has expired if access to shared memory is not granted;

repeating said requesting step if access to shared memory is not granted and the timer has not expired;

updating read error statistics if access to shared memory is not granted and the timer has expired; and updating parity error statistics if parity errors are identified.

7. In a system bus having a master-slave architecture, shared memory controlled by a plurality of registers, a slave central processing unit, and a slave bus controller, a process of writing data to the shared memory, the process comprising the steps of:

requesting access to said shared memory by said slave central processing unit by writing a request bit on a first register;

reading an access bit on a second register to determine whether the access bit is set and access to the shared memory is granted;

writing data to the shared memory by said slave central processing unit; and sending the data to a master central processing unit by writing a done bit on a third register by said slave central processing unit.

8. The process of claim 7, wherein the access bit is set by the slave bus controller.

9. The process of claim 8, further including the steps of starting a shared memory access timer;

determining whether the timer has expired if access to shared memory is not granted;

repeating said requesting step if access to shared memory is not granted and the timer has not expired; and updating write error statistics if access to shared memory is not granted and the timer has expired.

10. In a system bus having a master-slave architecture, shared memory controlled by a plurality of registers, a slave central processing unit, and a slave bus controller, a process of reading data from shared memory, the process comprising the steps of:

requesting access to said shared memory by said slave central processing unit by writing a request bit on a first register;

reading an access bit on a second register to determine whether the access bit is set and access to shared memory is granted;

identifying whether parity errors exist;

reading data from the shared memory by said slave central processing unit if parity is correct; and releasing access to said shared memory by writing a done bit to a third register by said slave central processing unit.

11. The process of claim 10, wherein the access bit is set by the master bus controller.

12. The process of claim 11, further including the steps of starting a shared memory access timer;

determining whether the timer has expired if access to shared memory is not granted;

repeating said requesting step if access to shared memory is not granted and the timer has not expired;

updating read error statistics if access to shared memory is not granted and the timer has expired; and updating parity error statistics if parity errors are identified.

13. In a system bus having a master-slave architecture, shared memory controlled by a plurality of registers, a master central processing unit, and a master bus controller, a process of writing data to the shared memory, the process comprising the steps of:

requesting access to said shared memory by said master central processing unit by writing a request bit on a first register;

reading an access bit on a second register to determine whether the access bit is set and access to the shared memory is granted, said access bit being set by the master bus controller;

writing data to the shared memory by said master slave central processing unit;

reading the access bit on the second register to determine whether the access bit is cleared and access to the shared memory is complete;

starting a shared memory access timer;

determining whether the timer has expired if access to shared memory is not granted;

repeating said requesting step if access to the shared memory is not granted and the timer has not expired; and updating write error statistics if access to shared memory is not granted and the timer has expired.

14. In a system bus having a master-slave architecture, shared memory controlled by a plurality of registers, a master central processing unit, and a master bus controller, a process of reading data from the shared memory, the process comprising the steps of:

requesting access to said shared memory by said master central processing unit by writing a request bit on a first register;

reading an access bit on a second register to determine whether the access bit is set and access to the shared memory is granted, said access bit being set by the master bus controller;

identifying whether parity error exists;

reading data from the shared memory by said master slave central processing unit if parity is correct;

reading the access bit on the second register to determine whether the access bit is cleared and access to the shared memory is complete;

starting a shared memory access timer;

determining whether the timer has expired if access to shared memory is not granted;

repeating said requesting step if access to the shared memory is not granted and the timer has not expired;

updating write error statistics if access to shared memory is not granted and the timer has expired; and updating parity error statistics if parity error are identified.

* * * * *